(12) United States Patent
Iwabuchi et al.

(10) Patent No.: US 12,464,375 B2
(45) Date of Patent: Nov. 4, 2025

(54) REFLECTION DIRECTION CONTROL SYSTEM, REFLECTION DIRECTION CONTROL DEVICE, REFLECTION DIRECTION CONTROL METHOD, AND REFLECTION DIRECTION CONTROL PROGRAM

(71) Applicant: NTT, Inc., Tokyo (JP)

(72) Inventors: Masashi Iwabuchi, Musashino (JP); Tomoaki Ogawa, Musashino (JP); Tomoki Murakami, Musashino (JP); Riku Omiya, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 251 days.

(21) Appl. No.: 18/016,370

(22) PCT Filed: Jul. 20, 2020

(86) PCT No.: PCT/JP2020/028123
§ 371 (c)(1),
(2) Date: Jan. 16, 2023

(87) PCT Pub. No.: WO2022/018800
PCT Pub. Date: Jan. 27, 2022

(65) Prior Publication Data
US 2023/0276255 A1 Aug. 31, 2023

(51) Int. Cl.
*H04W 16/28* (2009.01)
*H01Q 3/46* (2006.01)

(52) U.S. Cl.
CPC ............. *H04W 16/28* (2013.01); *H01Q 3/46* (2013.01)

(58) Field of Classification Search
CPC ............................... H04W 16/28; H01Q 3/46
(Continued)

(56) References Cited

U.S. PATENT DOCUMENTS

2011/0244786 A1  10/2011  Fujii et al.

FOREIGN PATENT DOCUMENTS

| EP | 2182582 A1 * | 5/2010 | .............. H01Q 3/46 |
| FR | 2952261 A1 * | 5/2011 | ....... H04L 12/40169 |

(Continued)

OTHER PUBLICATIONS

Wu, IRS aided wireless communications: A Tutorial (Year: 2020).*
(Continued)

*Primary Examiner* — Harry K Liu

(57) ABSTRACT

The reflection direction control system includes a plurality of reflection units each including a plurality of reflection elements, a position estimation unit for estimating a position of each of the wireless terminals on the basis of radio waves transmitted to the plurality of reflection parts wireless terminals, a direction estimation unit for estimating an incident direction of the radio waves transmitted by each of the wireless terminals to the reflection units, a phase calculation unit for calculating a phase of the radio waves to be reflected so that the reflection unit reflects the radio waves made incident in the direction estimated by the direction estimation unit in a predetermined direction, and a phase control unit for controlling the phase of the radio waves reflected by each of the plurality of reflection elements on the basis of the phase calculated by the phase calculation unit.

8 Claims, 10 Drawing Sheets

(58) Field of Classification Search
USPC .................................................... 342/367
See application file for complete search history.

(56) References Cited

FOREIGN PATENT DOCUMENTS

| JP | 2011064584 A | * | 3/2011 | ............... H01Q 3/24 |
| JP | 2011211515 A | | 10/2011 | |
| WO | WO-0076026 A1 | * | 12/2000 | ......... H01Q 15/0026 |
| WO | WO-2019086113 A1 | * | 5/2019 | ........... H04B 7/0619 |
| WO | WO-2021221603 A1 | * | 11/2021 | ........... G01S 5/0036 |

OTHER PUBLICATIONS

C. Liaskos, A. Tsioliaridou, A. Pitsillides, S. Ioannidis, and I. Akyildiz, "Using Any Surface to Realize a New Paradigm for Wireless Communications", Communications of the ACM, Nov. 2018., vol. 61, No. 11, pp. 30-33.

E. Basar, M. D. Renzo, J. D. Rosny, M. Debbah, M-SAlouini, and R. Zhang, "Wireless Communications Through Reconfigurable Intelligent Surfaces", IEEE Access, Aug. 2019., vol. 7, pp. 116753-116773.

Q. Wu, and R. Zhang, "Intelligent Reflecting Surface Enhanced Wireless Network via Joint Active and Passive Beamforming", IEEE transaction on wireless communications, Nov. 2019., vol. 18, No. 11, pp. 5394-5409.

Sha Hu et al., "Spherical Large Intelligent Surfaces, Oct. 16, 2019", arXiv:1907.02699v2 [eess.SP] Section2.5.

Yaoshen Cui et al., "An Efficient CSI Acquisition Method for Intelligent Reflecting Surface-assisted mmWave Networks", arXiv:1912.12076v1 [cs. IT], Dec. 27, 2019 Section III. D.

Beixiong Zheng et al., "Intelligent Reflecting Surface-Assisted Multiple. Access With User Pairing: NOMA or OMA?", IEEE Communications Letters, vol. 24, No. 4, Jan. 27, 2020 Section II, Fig. 1.

Henk Wymeersch et al., "Radio Localization and Mapping with Reconfigurable Intelligent Surfaces", Jun. 11, 2020, arXiv: 1912.09401v2 [eess.SP], Challenges and Opportunities, RIS control, p. 6.

* cited by examiner

REFLECTION DIRECTION CONTROL SYSTEM, REFLECTION DIRECTION CONTROL DEVICE, REFLECTION DIRECTION CONTROL METHOD, AND REFLECTION DIRECTION CONTROL PROGRAM

CROSS-REFERENCE TO RELATED APPLICATIONS

This application is a 371 U.S. National Phase of International Application No. PCT/JP2020/028123, filed on Jul. 20, 2020. The entire disclosure of the above application is incorporated herein by reference.

TECHNICAL FIELD

The present invention relates to a reflection direction control system, a reflection direction control device, a reflection direction control method, and a reflection direction control program.

BACKGROUND ART

To realize high speed and large capacity wireless access, using a high frequency band that can ensure a broad bandwidth draws attention. For example, high speed and large capacity are realized by using a 28 GHz band in a fifth generation mobile communication system and a 60 GHz band in IEEE 802.11ad (millimeter wave wireless LAN system) which is a wireless LAN standard.

In a high frequency band, radio waves are significantly attenuated compared with that in a low frequency band, and have radio properties of being less likely to be diffracted. Therefore, a high frequency band usage has problems that transmission distance is short and a reception quality is significantly deteriorated due to shielding.

In order to compensate the radio wave attenuation, beamforming is advantageous that uses a multi-element antenna in a transmitter station and a receiver station. By compensating the radio wave attenuation based on a beamforming gain, it is possible to increase the transmission distance.

In the beamforming, radio waves from a specific direction are strongly transmitted and received in both the transmitter station and the receiver station, and thus radio waves from one high-power path is mainly received by the receiver station. As a result, in the beamforming, the number of spatial multiplexing is kept as 1 (or 2 in the case of polarized multiplexing), and it is also difficult to achieve the space diversity effect by receiving the same signal.

On the other hand, to improve the deterioration of the reception quality caused by shielding or over-the-horizon, there is a method in which multiple antennas are installed. For example, by installing multiple transmission antennas, it is possible to reduce the range of shielding or over-the-horizon. It is also possible to solve the above-described problems in beamforming by installing multiple transmission antennas. However, installing multiple transmission antennas causes problems that the network cost increases and the installation place becomes insufficient. In view of providing multiple transmission points, it is also advantageous to use reflectors and the like that are less expensive and have a smaller installation scale and less restrictions.

Conventionally, it is difficult to dynamically control the reflection characteristics. However, a reflector (dynamic reflector) that enables dynamic control of reflection characteristics using a metasurface or array element structure have been successfully developed, and thus it is possible to realize a method for achieving spatial multiplexing and the space diversity gain while using dynamic reflector to reduce a range of shielding or over-the-horizon (for example, see NPL 1, 2, 3).

As a method of controlling the dynamic reflector, there is a method of changing the characteristics of the radio wave by controlling the phase of the radio wave when the dynamic reflector reflects the radio wave. For example, there is a method of changing the phase of a radio wave reflected by a dynamic reflector composed of array elements on the basis of channel information (CSI: Channel State Information) between transmission and reception stations (for example, see NPL 3).

CITATION LIST

Non Patent Literature

[NPL 1] C. Liaskos, A. Tsioliaridou, A. Pitsillides, S. Ioannidis, and I. Akyildiz, "Using Any Surface to Realize a New Paradigm for Wireless Communications", Communications of the ACM, November 2018., Vol. 61, No. 11, pp. 30-33

[NPL 2] E. Basar, M. D. Renzo, J. D. Rosny, M. Debbah, M-SAlouini, and R. Zhang, "Wireless Communications Through Reconfigurable Intelligent Surfaces", IEEE Access, August 2019., Vol. 7, pp. 116753-116773

[NPL 3] Q. Wu, and R. Zhang, "Intelligent Reflecting Surface Enhanced Wireless Network via Joint Active and Passive Beamforming", IEEE transaction on wireless communications, November 2019., vol. 18, No. 11, pp. 5394-5409

SUMMARY OF INVENTION

Technical Problem

However, in the conventional system based on channel information between the transmission and reception stations, the characteristics of the reception station can be optimized, but channel information for each array element through which radio waves pass is required. For example, when the dynamic reflector is composed of 100 array elements, it is necessary to calculate the amount of phase change based on 100 channel information.

In other words, large overhead occurs in order to obtain channel information. In addition, since it is considered that a certain calculation resource is necessary to calculate the amount of phase change of each array element, it is assumed that the amount of phase change is calculated on the base station side. In this case, quality improvement by the dynamic reflector cannot be realized unless the base station has a new function.

It is also assumed that the base station and the dynamic reflector are installed at a remote place. Therefore, in the conventional method, a communication means for reflecting the amount of phase change calculated by the base station on the dynamic reflector is required, and the dynamic reflector also needs a function for cooperating with the base station.

The present invention has been made in view of the above-mentioned problems, and is provided with a reflection direction control system, a reflection direction control device, a reflection direction control method, and a reflection direction control program.

Solution to Problem

A reflection direction control system according to an aspect of the present invention includes a plurality of reflection units each including a plurality of reflection elements, a position estimation unit that estimates a position of each of wireless terminals on the basis of radio waves transmitted by one or more wireless terminals to the plurality of reflection units, a direction estimation unit that estimates an incident direction of each of the radio wave transmitted by wireless terminals to the reflection units on the basis of each position of wireless terminals estimated by the position estimation unit, a phase calculation unit that calculates a phase of the radio wave to be reflected by each of the plurality of reflection elements so that the reflection unit reflects the radio wave incident in the direction estimated by the direction estimation unit in a predetermined direction, and a phase control unit that controls the phase of the radio wave reflected by each of the plurality of reflection elements on the basis of the phase calculated by the phase calculation unit.

A reflection direction control device according to an aspect of the present invention includes a position estimation unit that estimates a position of each wireless terminal on the basis of radio waves transmitted by one or more wireless terminals to a plurality of reflection units each including a plurality of reflection elements, a direction estimation unit that estimates an incident direction of the radio wave transmitted by each of the wireless terminals to the reflection units on the basis of each position of wireless terminals estimated by the position estimation unit, a phase calculation unit that calculates a phase of the radio wave to be reflected by each of the plurality of reflection elements so that the reflection unit reflects the radio wave incident in the direction estimated by the direction estimation unit in a predetermined direction, and a phase control unit that controls the phase of the radio wave reflected by each of the plurality of reflection elements on the basis of the phase calculated by the phase calculation unit.

A reflection direction control method according to an aspect of the present invention includes a position estimation step of estimating a position of each wireless terminal on the basis of radio waves transmitted by one or more wireless terminals to a plurality of reflection units each including a plurality of reflection elements, a direction estimation step of estimating an incident direction of the radio wave transmitted by each of the wireless terminals to the reflection units on the basis of each position of estimated wireless terminals, a phase calculation step of calculating a phase of the radio wave to be reflected by each of the plurality of reflection elements so that the reflection unit reflects the radio wave incident in the estimated direction in a predetermined direction, and a phase control step of controlling the phase of the radio wave reflected by each of the plurality of the reflection elements based on the calculated phase.

Advantageous Effects of Invention

According to the present invention, the reflection direction of the radio wave can be dynamically controlled with a small amount of calculation.

DESCRIPTION OF EMBODIMENTS

Figure 10:
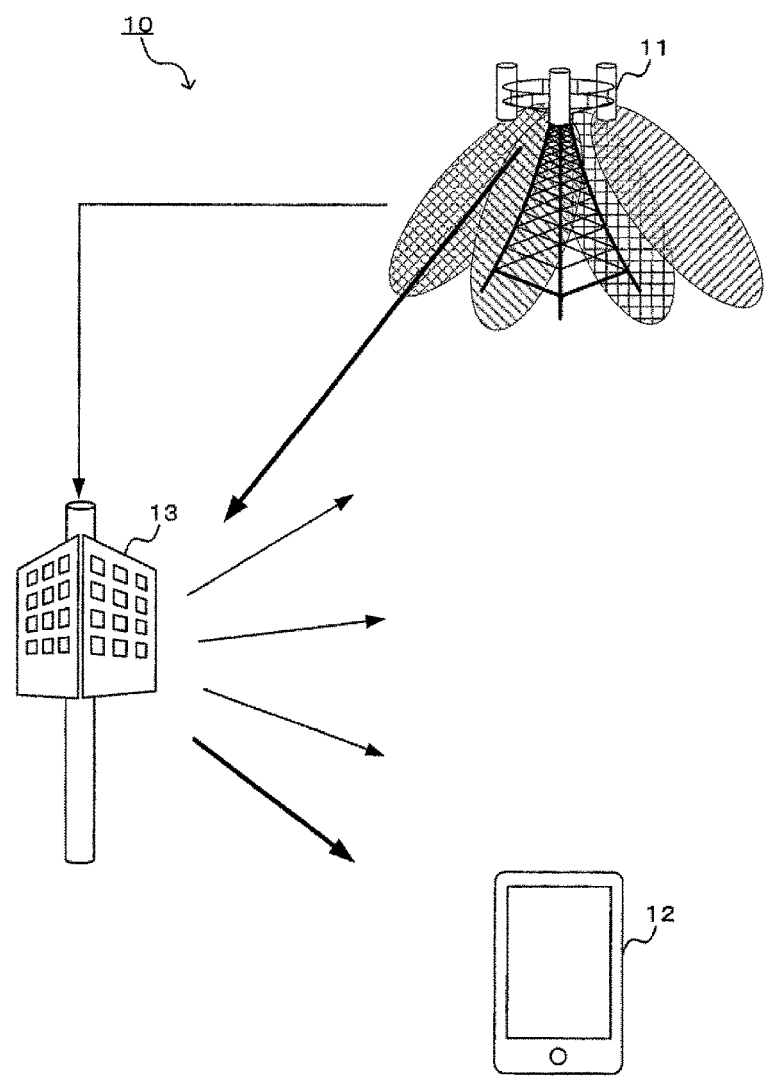
FIG. 10 is a diagram showing a comparative example of a configuration of the wireless communication system including the dynamic reflector.

In the description of the reflection direction control system according to an embodiment, the background that the present invention has been achieved will be first described. FIG. 10 is a diagram showing a comparative example of a configuration of a wireless communication system 10 including a dynamic reflector.

In the wireless communication system 10, a dynamic reflector 13 having a plurality of reflection elements reflects and relays radio waves in order to perform wireless communication between a base station 11 and a wireless terminal 12. At this time, the base station 11 acquires channel information (CSI: Channel State Information) for all of a plurality of reflection elements included in the dynamic reflector 13, and adjusts a phase of a radio wave reflected by the dynamic reflector 13.

Therefore, in addition to a general base station function, the base station 11 needs an advanced signal processing function for acquiring and processing channel information for all of the plurality of reflection elements, and a function for notifying the dynamic reflector 13 of information on a phase for changing reflection characteristics.

That is, the base station 11 increases the overhead for acquiring channel information, and if the number of reflection elements is large, the amount of calculation for dynamically controlling the phase of the radio wave reflected by the dynamic reflector 13 becomes enormous.

Figure 1:
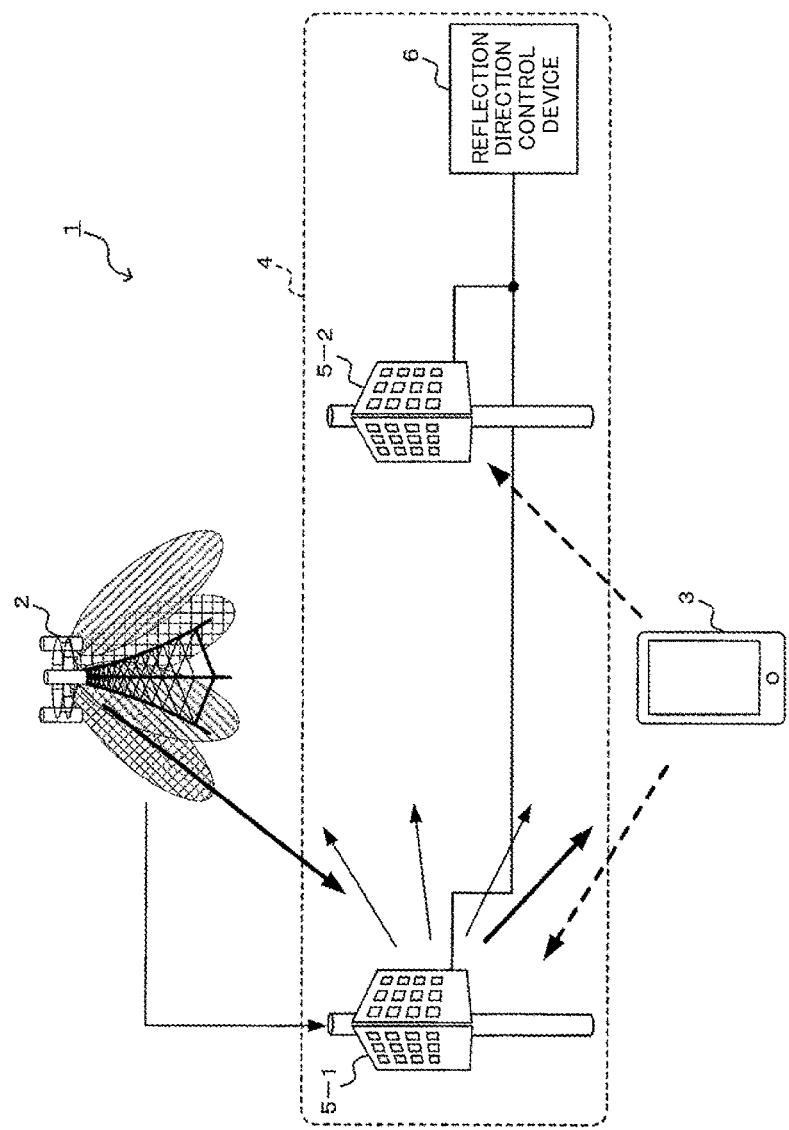
FIG. 1 is a diagram showing a configuration of a wireless communication system according to an embodiment of the present invention.

Next, operations of the wireless communication system according to the embodiment will be described. FIG. 1 is a diagram showing a configuration of a wireless communication system 1 according to the embodiment of the present invention. As shown in FIG. 1, the wireless communication system 1 is configured such that, for example, a base station 2 and one or more wireless terminals 3 perform wireless communication via a reflection direction control system 4.

The reflection direction control system 4 includes, for example, a dynamic reflector 5-1, 5-2, and a reflection direction control device 6. For example, the dynamic reflector 5-1, 5-2 respectively receive wireless signals transmitted by the wireless terminal 3, and transmit the processed signals to the reflection direction control device 6.

The reflection direction control device 6 estimates (measures) a position of the wireless terminal 3 on the basis of signals inputted from the dynamic reflector 5-1, 5-2, respectively, and estimates the incident direction of radio waves transmitted from the wireless terminal 3 to the dynamic reflector 5-1, 5-2, respectively.

The reflection direction control device 6 calculates a phase of the radio wave to be reflected by each of the plurality of reflection elements so that the dynamic reflector 5-1, 5-2 reflect the radio wave made incident in the estimated direction toward the base station 2, for example. At this time, the reflection direction control device 6, on the basis of, for example, preset position information of the base station 2 or position information of the base station 2 estimated by using a radio wave transmitted by the base station 2 and reflected by the dynamic reflector 5-1, 5-2, the phase of the radio wave to be reflected by each of the plurality of reflection elements is calculated.

The reflection direction control device 6 transmits information indicating the phase calculated for each of the plurality of reflection elements to the dynamic reflector 5-1, 5-2.

The dynamic reflector 5-1, 5-2 dynamically control the phase of the radio wave, on the basis of the received information from the reflection direction control device 6 so as to efficiently relay the radio waves transmitted by the wireless terminal 3 to the base station 2.

Similarly, the reflection direction control system 4 dynamically controls the phases of the radio waves reflected by the plurality of reflection elements so as to efficiently relay the radio waves transmitted by the base station 2 to the wireless terminal 3. Here, an example in which the dynamic reflector 5-1, 5-2 dynamically control the phase of the radio wave is described, but instead of the dynamic reflector 5-1, 5-2 the reflection direction control system 4 may be configured as a relay device that relays the radio wave by a repeater having a power amplifier.

That is, the wireless communication system 1 can dynamically control the reflection direction of the radio wave without acquiring channel information for all of the plurality of reflection elements and without having an advanced signal processing function for processing the channel information for all of the reflection elements.

Next, each unit configuring the reflection direction control system 4 will be described. When any one of a plurality of structures such as the dynamic reflector 5-1, 5-2, it is simply abbreviated as the dynamic reflector 5.

Figure 2:
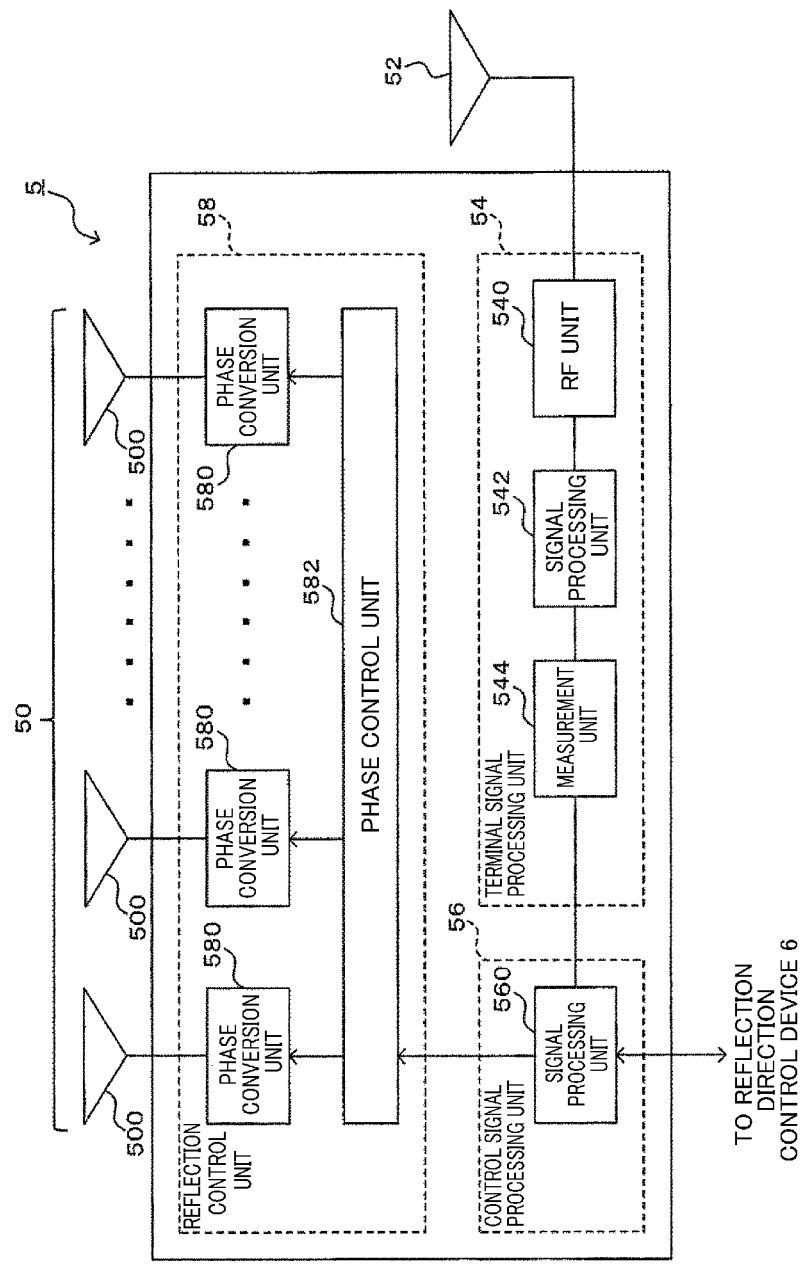
FIG. 2 is a functional block illustrating functions of a dynamic reflector.

FIG. 2 is a functional block showing the functions of the dynamic reflector 5. As shown in FIG. 2, the dynamic reflector 5 includes, for example, a reflection unit 50, an antenna unit 52, a terminal signal processing unit 54, a control signal processing unit 56 and a reflection control unit 58.

The reflection unit 50 includes a plurality of reflection elements 500, and for example, the plurality of reflection elements 500 is arranged in an array shape. The reflection element 500 reflects the radio waves transmitted by the base station 2 and the radio wave transmitted by the wireless terminal 3 according to the control of the reflection control unit 58. For example, the reflection element 500 is a so-called metamaterial, and has a characteristic of shifting a phase when reflecting the radio wave.

The antenna unit 52 transmits and receives radio waves to and from the wireless terminal 3. Specifically, the antenna unit 52 receives radio wave (wireless signals) transmitted by the wireless terminal 3, outputs the received signal (notification signal or the like) to the terminal signal processing unit 54, and transmits the signal output by the terminal signal processing unit 54 to the wireless terminal 3.

The terminal signal processing unit 54 includes an RF unit 540, a signal processing unit 542, and a measurement unit 544. The RF unit 540 performs signal processing necessary for the signal processing unit 542 to perform digital signal processing on the radio waves received by the antenna unit 52. The RF unit 540 performs processing necessary for converting the transmission signal processed by the signal processing unit 542 into a predetermined radio wave and transmitting the radio wave. For example, the RF unit 540 performs processing such as signal amplification, down-conversion from a system band, or up-conversion to a system band, and filtering.

The signal processing unit 542 has a function of demodulating the wireless signals, and extracts an identification signal for identifying the wireless terminal 3 from the demodulated signal, for example, and outputs the identification signal to the measurement unit 544. In order to transmit the radio signals, the signal processing unit 542 modulates a control signal used for wireless communication with the wireless terminal 3, for example, and outputs the modulated control signal to the RF unit 540.

The measurement unit 544 has a function of measuring the reception power, arrival time or the like of the radio signals. For example, the measurement unit 544 may directly measure the signals output from the RF unit 540, or may perform measurement using the signals demodulated by the signal processing unit 542. Then, the measurement unit 544 outputs the identification signal of the wireless terminal 3 input from the signal processing unit 542 and the measurement result to the control signal processing unit 56 in association with each other.

The control signal processing unit 56 has, for example, a signal processing unit 560. The signal processing unit 560 performs processing for transmitting signal inputs from, for example, the measurement unit 544 to the reflection direction control device 6 via a communication unit (not shown). The control signal processing unit 56 processes signals received from the reflection direction control device 6 via the communication unit (not shown) and outputs the processed signal to the reflection control unit 58. For example, the control signal processing unit 56 controls the reflection control unit 58 to control the reflection unit 50 on the basis of a signal (for example, control information for a phase such as an amount of a phase change) received from the reflection direction control device 6.

The reflection control unit 58 includes a plurality of phase conversion units 580 and a phase control unit 582 for controlling each of the phase conversion units 580. The phase conversion unit 580 is provided individually for each of the reflection elements 500, for example, and performs conversion for changing the phase of the radio wave reflected by the reflection element 500 according to control from the phase control unit 582. The phase control unit 582 controls each of the phase conversion units 580 on the basis of a signal (phase calculated by a phase calculation unit 66 described later) input from the signal processing unit 560.

For example, the phase control unit 582 controls each of the plurality of phase conversion units 580 so that phases of radio waves reflected by each of the plurality of reflection elements 500 are shifted little by little on the basis of control information on a phase transmitted by the reflection direction control device 6. For example, when the reflection element 500 is the meta-material described above, the phase conversion unit 580 changes the characteristics of the reflection element 500 in accordance with the control of the phase control unit 582, thereby dynamically changes the phase shift amount by the reflection element 500. In this way, the phase control unit 582, by controlling the characteristic change of the meta-material, multiplying the amount of the phase change, and adding a predetermined delay, controls so that the reflection unit 50 performs beam forming in a predetermined direction.

When the controllable phase amount to the reflection element 500 is discrete, the phase control unit 582 selects a phase amount closest to the phase change amount transmitted by the reflection direction control device 6 from among settable phase amounts, and controls each of the plurality of phase conversion units 580.

Figure 3:
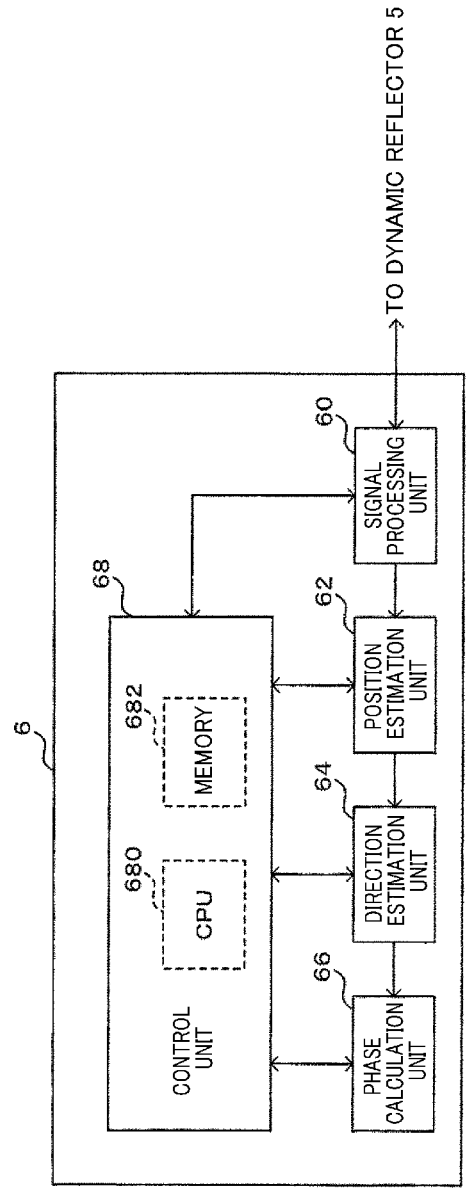
FIG. 3 is a functional block diagram illustrating functions of a reflection direction control device.

FIG. 3 is a functional block showing functions of the reflection direction control device 6 according to an embodiment. As shown in FIG. 3, the reflection direction control device 6 includes a signal processing unit 60, a position estimation unit 62, a direction estimation unit 64, a phase calculation unit 66 and a control unit 68.

The signal processing unit 60 receives the signals transmitted by the respective dynamic reflectors 5 through a communication section (not shown), and outputs the signals obtained by demodulation to the position estimation unit 62. The signal processing unit 60 transmits signals input from the control unit 68 (for example, information indicating a phase to be described later) to each of the dynamic reflectors 5 via the communication unit (not shown).

The position estimation unit 62 estimates each position of the wireless terminals 3 by using the information demodulated by the signal processing unit 60 and collected from the plurality of dynamic reflectors 5. For example, the position estimation unit 62 estimates the position of each of the wireless terminals 3 on the basis of radio waves transmitted to the plurality of dynamic reflectors 5 by each of the wireless terminals 3.

The signal demodulated by the signal processing unit 60 includes, for example, an identification number of each wireless terminal 3. Therefore, the position estimation unit 62 can use information such as received power or arrival time associated with the same identification number collected within a predetermined period.

The position estimation unit 62 may estimate the position of the wireless terminal 3 by using a difference in arrival time of radio waves from the plurality of dynamic reflector 5 with respect to the same wireless terminal 3. A method for estimating the position of each of the wireless terminals 3 using the received power or the arrival time may be any algorithm.

The signal transmitted by the wireless terminal 3 to estimate the position of the wireless terminal 3 by the reflection direction control device 6 may be a signal of the same system as the wireless communication system used for communication between the base station 2 and the wireless terminal 3 or a signal of a different system.

Specifically, in order to estimate the position of the wireless terminal 3 by the reflection direction control device 6, the wireless terminal 3 may transmit a signal of a system specified by an existing wireless communication system such as a cellular system or a wireless LAN, or may transmit a signal of another system specified uniquely.

The wireless terminal 3 may transmit signals in the same frequency band or may transmit signals in different frequency bands. For example, the wireless terminal 3 may use a high-frequency band in communication with the base station 2, and the reflection direction control device 6 may use a low-frequency band to transmit a signal used for estimating the position of the wireless terminal 3. Thus, the reflection direction control device 6 can avoid a situation where a signal used for estimating the position of the wireless terminal 3 is difficult to reach because of the signal of the high frequency band, and positioning is facilitated.

Then, the position estimation unit 62 outputs position information indicating the estimated positions of the wireless terminals 3 to the direction estimation unit 64 and the control unit 68 in association with the identification number of the wireless terminals 3. Further, the position estimation unit 62 similarly outputs the identification number of, for example, a predetermined related dynamic reflector 5 to the direction estimation unit 64.

The direction estimation unit 64 estimates an incident direction (and a reflection direction) of the radio waves transmitted by each of the wireless terminals 3 to the reflection unit 50 on the basis of the respective positions of the wireless terminals 3 estimated by the position estimation unit 62. For example, the direction estimation unit 64 estimates the incident direction of radio waves from the wireless terminals 3 to the dynamic reflector 5 (reflection direction from the dynamic reflectors 5 to the wireless terminals 3) by using the position information of each wireless terminal 3 input from the position estimation unit 62, and the position information and the installation direction information of each dynamic reflector 5.

Figure 4:
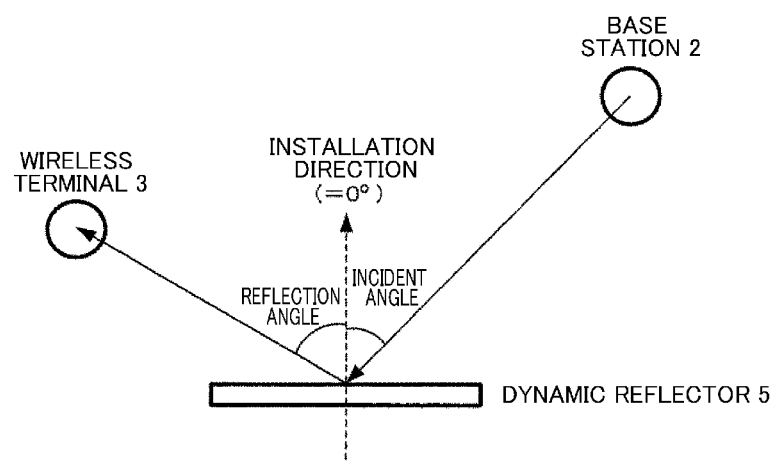
FIG. 4 is a diagram schematically showing the relationship between the direction of incident and reflection of radio waves on the dynamic reflector and the direction of installation of the dynamic reflector.

FIG. 4 is a diagram schematically showing the relationship between the direction of incident and reflection of radio waves on the dynamic reflector 5 and the installation direction of the dynamic reflector 5. In FIG. 4, the incident direction and the reflection direction of the radio wave during the downlink transmission are shown, but in the uplink transmission, the incident direction and the reflection direction are reversed, and the incident angle and the reflection angle are replaced with each other.

For example, it is assumed that the direction estimation unit 64 acquires information indicating the position and installation direction of each dynamic reflector 5 in advance. The information indicating the position and installation direction of the dynamic reflector 5 may be acquired by the reflection direction control device 6 when the dynamic reflector 5 is installed, or the dynamic reflector 5 has a function of measuring the position and installation direction of itself, and the reflection direction control device 6 may acquire the position and installation direction of itself measured by the dynamic reflector 5.

For example, the dynamic reflector 5 may measure its own position by a GPS (Global Positioning System), or may measure its own installation direction and inclination by a gyro sensor. Then, the dynamic reflector 5 transmits the measurement result to the reflection direction control device 6 each measured time at an arbitrarily set timing. The reflection direction control device 6 sequentially updates and stores the measurement result received from the dynamic reflector 5.

The direction estimation unit 64 may acquire direction information indicating a direction from the dynamic reflector 5 to the base station 2 in advance. For example, the direction estimation unit 64 may acquire direction information indicating a direction from the dynamic reflector 5 to the base station 2 when the dynamic reflector 5 is installed, or may estimate the direction information on the basis of the position of the base station 2 and the position of the dynamic reflector 5.

Further, the reflection direction control device 6 estimates the position of the base station 2 similarly to the case where the position of the wireless terminal 3 is estimated, and may uses the position information of the dynamic reflector 5 acquired in advance and the position information and the installation direction of the dynamic reflector 5 acquired by the above method to calculate the direction from the dynamic reflector 5 to the base station 2.

As described above, the direction estimation unit 64 may estimate the incident angle shown in FIG. 4 by using the direction information indicating the direction from the dynamic reflector 5 to the base station 2. The direction estimation unit 64 may estimate the reflection angle shown in FIG. 4 by using the position information of the wireless terminal 3 estimated by the position estimation unit 62 and the position information and the installation direction of the dynamic reflector 5 acquired by the above method.

The direction estimation unit 64 estimates a direction from the dynamic reflector 5 with respect to an installation direction of the dynamic reflector 5 to the wireless terminal 3 as a reflection angle for reflecting radio waves from the base station 2 during downlink transmission. In uplink transmission, a direction from the wireless terminal 3 with respect to an installation direction of the dynamic reflector 5 to the dynamic reflector 5 is estimated as an incident angle at which a radio wave from the wireless terminal 3 is made incident.

When there is a plurality of identification numbers of the related dynamic reflectors 5 input from the position estimation unit 62, the direction estimation unit 64 estimates an incident direction (and a reflection direction) of the radio wave to each of the dynamic reflectors 5.

Then, the direction estimation unit 64 associates direction information indicating the estimated incident direction (and reflection direction) of the radio wave with the identification number of each wireless terminal 3 and the identification number of each dynamic reflectors 5, and outputs the direction information to the phase calculation unit 66 (FIG. 3) and the control unit 68.

The phase calculation unit 66 calculates a phase of a radio wave to be reflected by each of the plurality of reflection elements 500 included in each of the plurality of dynamic reflectors 5 so that the reflection unit 50 reflects the radio waves incident in the direction estimated by the direction estimation unit 64 in a predetermined direction, and outputs information indicating the calculated phase to the control unit 68. Here, the phase calculation unit 66 calculates the phase of the radio waves by using the incident angle and the reflection angle shown in FIG. 4, for example.

The phase calculation unit 66 may refer to position information of the plurality of wireless terminals 3 instead of the direction from the dynamic reflector 5 to the wireless terminal 3, and calculate the phase of the radio waves so that the reflection unit 50 performs beam forming in the direction to the position where the most number of wireless terminals 3 are likely to exist.

For example, the phase calculation unit 66 may calculate the mutual distance between the wireless terminals 3 by using the positional information of the plurality of wireless terminals 3, and cluster the plurality of wireless terminals 3 in which the mutual distance between the wireless terminals 3 is equal to or less than a predetermined value.

The phase calculation unit 66 obtains a position centroid point of the wireless terminals 3 in the cluster from the position information of each wireless terminals 3 in the cluster, and, instead of a direction from the dynamic reflector 5 to the wireless terminal 3, uses a direction from the dynamic reflector 5 to the position centroid of the wireless terminals 3.

That is, the phase calculation unit 66 may calculate the phase of the radio wave to be reflected by each of the plurality of reflection elements 500 so that the reflection unit 50 reflects the radio waves incident from a predetermined direction toward the cluster composed of a plurality of wireless terminals 3 satisfying a predetermined condition.

The phase calculation unit 66 may calculate the phase of the radio wave to be reflected by each of the plurality of reflection elements 500 for each reflection unit 50 on the basis of a predetermined priority.

When one reflection unit 50 reflects the radio waves transmitted by the plurality of wireless terminals 3, the phase calculation unit 66 divides the plurality of reflection elements 500 into a plurality of reflection element groups, and calculates the phase of the radio wave to be reflected by each the reflection elements 500 so that each reflection groups reflects the radio wave to the different wireless terminal 3.

The control unit 68 includes a CPU 680 and memory 682, and controls each unit constituting the reflection direction control device 6. The control unit 68 stores the information input from the position estimation unit 62, the direction estimation unit 64, and the phase calculation unit 66 in the memory 682, and outputs, for example, each of the information indicating the phase calculated by the phase calculation unit 66 to the signal processing unit 60.

The memory 682 stores, for example, position information of each wireless terminals 3, position information and installation direction of each dynamic reflector 5, direction from each dynamic reflector 5 to the wireless terminal 3, information indicating the phase calculated by the phase calculation unit 66, and the like.

The memory 682 may be configured to output the position information and the installation direction of each dynamic reflector 5 to the direction estimation unit 64 in response to a request from the direction estimation unit 64. The memory 682 may be configured to output the direction from the dynamic reflector 5 to the wireless terminal 3 to the phase calculation unit 66 in response to a request from the phase calculation unit 66.

When the reflection direction control device 6 receives signals for estimating the position of the wireless terminals 3 from the plurality of wireless terminals 3, the control unit 68 determines the priority of each of the wireless terminal 3 and the dynamic reflector 5 as shown by, for example, the next (1) to (4), and determines which dynamic reflector 5 should reflect the radio wave to which wireless terminals 3. The reflection direction control device 6 determines information to be transmitted to each dynamic reflector 5 on the basis of the determination.

(1) [Allocation Dynamic Reflector 5 to Wireless Terminal 3 on the Basis of Received Power]

The wireless terminal 3 is more likely to receive the benefit from the dynamic reflector 5 as the distance from the dynamic reflector 5 is shorter. Then, the control unit 68 controls the signal transmitted by the wireless terminal 3 so that the dynamic reflector 5 having measured the maximum received power reflects the radio wave toward the wireless terminal 3. When the number of the dynamic reflector 5 is larger than the number of the wireless terminals 3, the control unit 68 may allocate not only the dynamic reflector 5 have measured the maximum received power but also the dynamic reflector 5 having measured the next larger received power.

(2) [Prioritizing Wireless Terminal 3 on the Basis of Wireless Terminal 3 Position]

The control unit 68 may calculate a distance from the wireless terminal 3 to the dynamic reflector 5 by using the position information of the wireless terminal 3 estimated by the position estimation unit 62 and the position information of the dynamic reflector 5, and allocate the wireless terminal 3 having the shortest calculated distance to the dynamic reflector 5. When the number of the dynamic reflector 5 is larger than the number of the wireless terminals 3, the control unit 68 may allocate not only the dynamic reflector 5 whose distance becomes the shortest but also the dynamic reflector 5 whose distance becomes the next shorter distance.

(3) [Allocation Dynamic Reflector 5 to a Plurality of Wireless Terminals 3]

The control unit 68 may group the plurality of wireless terminals 3, for example, on the basis of the respective positions of the wireless terminals 3. For example, the control unit 68 calculates a distance between the two wireless terminals 3 on the basis of position information of the two wireless terminals 3, and associates the wireless terminals 3 as the same group when the calculated distance is equal to or less than a predetermined value.

The reflection direction control device 6 may determine the direction of a group having a large number of wireless terminals 3 as the reflection direction of the dynamic reflector 5 after the grouping processing.

Also, even when using the position information of the wireless terminal 3, the control unit 68 determines calculates the distance between the position of the representative wireless terminal selected arbitrarily in the group, the centroid point of the positions of all the wireless terminals in the group, and the position of the wireless terminal closest to the centroid point and the dynamic reflector 5, and allocates the group to the dynamic reflector 5 in units of a group in the same manner as in the above-mentioned (2). When the number of groups is smaller than the number of dynamic reflectors 5, the control unit 68 may allocate not only one dynamic reflector 5 closest to the group but also two or more dynamic reflectors 5.

(4) [Allocation Dynamic Reflector 5 to Wireless Terminal 3 Based on the Basis of Combination]

The control unit 68 may allocate the dynamic reflector 5 to the wireless terminal 3, for example, on the basis of a combination of the received power and the position of the wireless terminal 3 estimated by the position estimation unit 62.

Figure 5:
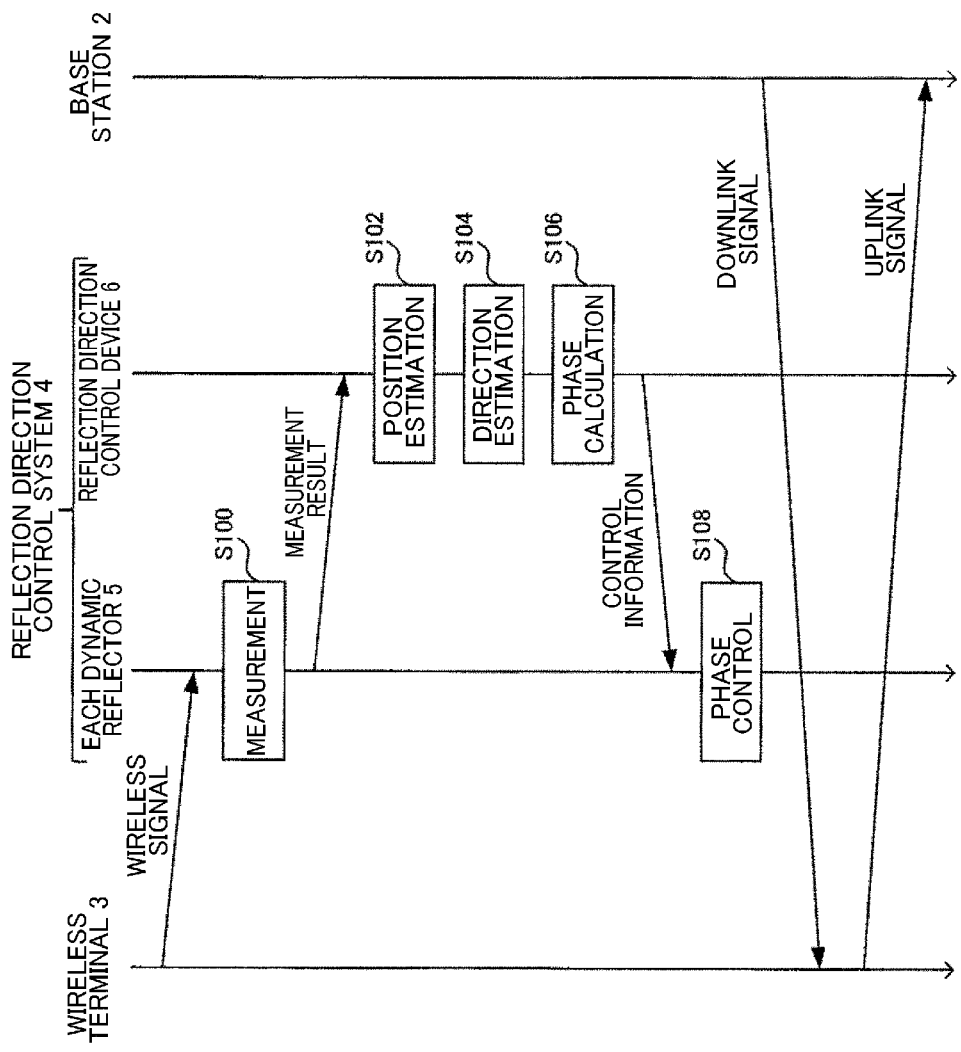
FIG. 5 is a diagram showing an example of a configuration of the wireless communication system.

Next, operation example of the wireless communication system 1 will be described. FIG. 5 is a sequence diagram showing operation example of the wireless communication system 1.

First, when the wireless terminal 3 transmits a radio signal to each dynamic reflector 5, each dynamic reflector 5 measures received power (S100), for example and transmits a measurement result to the reflection direction control device 6.

The reflection direction control device 6 estimates a position of the wireless terminal 3 on the basis of the radio signal transmitted from the wireless terminal 3 to the plurality of dynamic reflectors 5 (S102).

Next, the reflection direction control device 6 estimates an incident direction of the radio wave transmitted by the wireless terminal 3 to the reflection unit 50 on the basis of each estimated position of the wireless terminals 3 (S104).

Then, the reflection direction control device 6 calculates a phase of the radio wave to be reflected by each of the plurality of reflection elements 500 so that the reflection unit 50 reflects the radio wave made incident in the estimated direction toward the base station 2, and transmits the calculation result to each dynamic reflector 5 as control information (S106).

Each of the dynamic reflectors 5 performs phase control (reflection direction control) of the radio waves reflected by each of the plurality of reflection elements 500 on the basis of the received control information (S108). Thereafter, the wireless terminal 3 and the base station 2 mutually perform communication (downlink signals and uplink signals).

Figure 6:
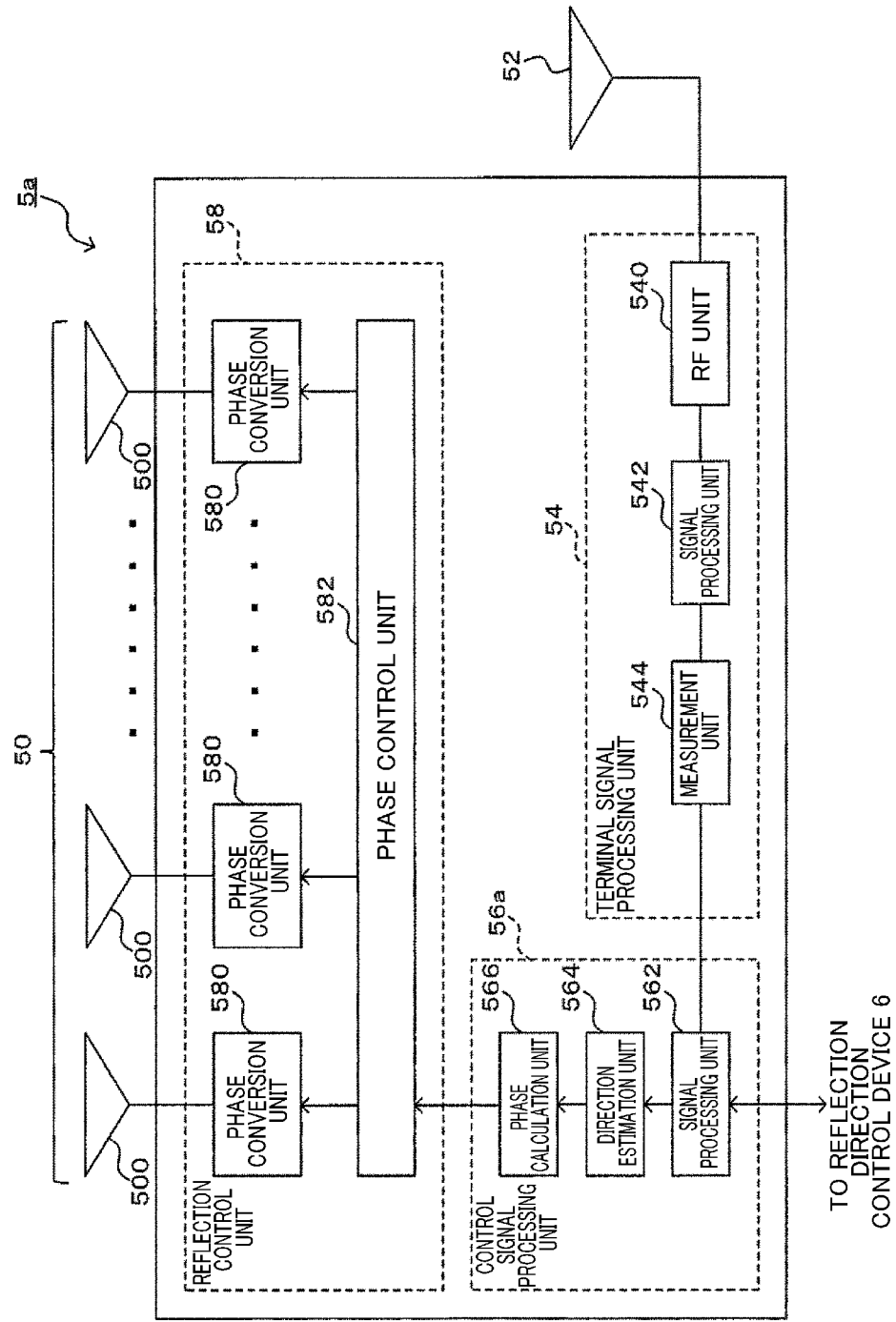
FIG. 6 is a functional block illustrating functions of a modification of the dynamic reflector.

Next, a modified example of the reflection direction control system 4 (dynamic reflector 5 and reflection direction control device 6) will be described. FIG. 6 is a functional block exemplifying functions of the modified example of a dynamic reflector 5 (dynamic reflector 5a).

As shown in FIG. 6, the dynamic reflector 5a includes, for example, a reflection unit 50, an antenna unit 52, a terminal signal processing unit 54, a control signal processing unit 56a and a reflection control unit 58. In the dynamic reflector 5a shown in FIG. 6, the same reference numerals are given to substantially the same components as those of the dynamic reflector 5 shown in FIG. 2.

The control signal processing unit 56a has a signal processing unit 562, a direction estimation unit 564, and a phase calculation unit 566.

The signal processing unit 562 transmits a signal input from, for example, the measurement unit 544 to the reflection direction control device 6 via a communication unit (not shown). The signal processing unit 562 processes a signal received from the reflection direction control device 6 via the communication unit (not shown), and outputs the processed signal to the direction estimation unit 564.

The direction estimation unit 564 estimates an incident direction (reflection direction) of radio waves transmitted by each of the wireless terminals 3 to the reflection unit 50 on the basis of the information (position of each of the wireless terminals 3 estimated by the information position estimation unit 62) input from the signal processing unit 562. For example, the direction estimation unit 564 estimates the incident direction from the wireless terminal 3 to the dynamic reflector 5 (reflection direction from the dynamic reflector 5 to the wireless terminal 3) by using the position information of each wireless terminal 3 and the position information and installation direction information of each dynamic reflector 5.

Here, the direction estimation unit 564 uses a preset value or a value measured and sequentially updated by the dynamic reflector 5 as the position information and the installation direction information of each dynamic reflector 5. Then, the direction estimation unit 564 outputs the estimated incident direction of the radio wave (reflection direction of the estimated radio wave from the dynamic reflector 5 to the wireless terminal 3) to the phase calculation unit 566.

The phase calculation unit 566 calculates the phase of the radio wave to be reflected by each of the plurality of reflection elements 500 included in each of the plurality of dynamic reflectors 5 so that the reflection unit 50 reflects the radio wave incident in the direction estimated by the direction estimation unit 564 in a predetermined direction, and outputs information indicating the calculated phase to the phase control unit 582.

Figure 7:
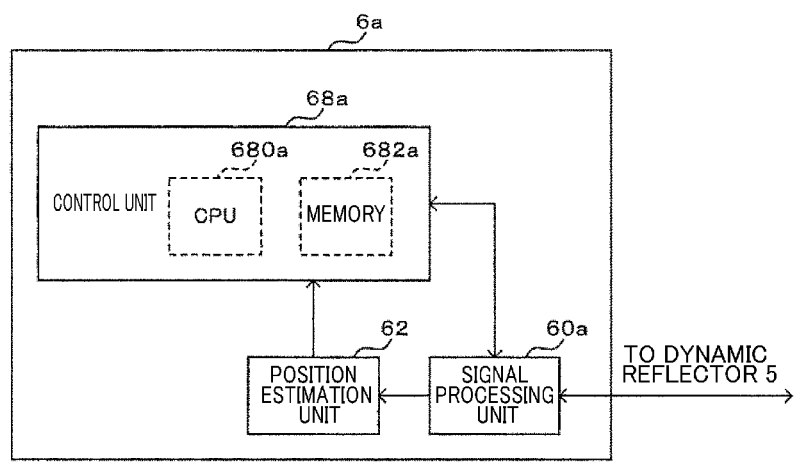
FIG. 7 is a functional block illustrating functions of a modification of the reflection direction control device.

FIG. 7 is a functional block exemplifying a modification of the reflection direction control device 6 (reflection direction control device 6a).

As shown in FIG. 7, the reflection direction control device 6a has a signal processing unit 60a, a position estimation unit 62, and a control unit 68a. In the reflection direction control device 6a shown in FIG. 7, the same reference numerals are given to substantially the same components as those of the reflection direction control device 6 shown in FIG. 3.

The signal processing unit 60a receives a signal transmitted by each dynamic reflector 5 through a communication unit not shown in the figure and outputs the signal obtained by demodulation to the position estimation unit 62. The signal processing unit 60a transmits the signal inputted from the control unit 68a (for example, the position information of the wireless terminal 3) to each dynamic reflector 5 through the communication unit not shown in the figure.

The control unit 68a includes a CPU 680a and memory 682a, and controls each unit constituting the reflection direction control device 6a. The control unit 68a stores information inputted from the position estimation unit 62 in memory 682a, and outputs each of the position information of the wireless terminal 3 estimated by the position estimation unit 62 to the signal processing unit 60a, for example.

The memory 682 stores, for example, the positional information of each wireless terminal 3, the positional information, the installation direction, and the like of each dynamic reflector 5.

The control unit 68a may perform the allocation processing of the wireless terminal 3 and the dynamic reflector 5a, and perform control so as to transmit the allocation result to the dynamic reflector 5a, similarly to the control unit 68. The control unit 68a may perform control so as to transmit the position information to all the dynamic reflectors 5a transmitting the information used for estimating the position of the wireless terminal 3. In the latter case, the control unit 68a may perform control so that the dynamic reflector 5a determines the priority of each of the wireless terminal 3 and the dynamic reflector 5a in the direction estimation unit 564, for example, like the next (1) to (4).

(1) [Prioritizing Wireless Terminal 3 on the Basis of Received Power]

The wireless terminal 3 is more likely to receive the benefit from the dynamic reflector 5a as the distance from the dynamic reflector 5a is shorter. When a wireless terminal 3 having a long distance from the dynamic reflector 5a, that is, a wireless terminal 3 having a small received power is given priority, many dynamic reflectors 5a arranged in the periphery react with the same wireless terminal 3, and more dynamic reflectors 5a can be used for a single wireless terminal 3 than necessary.

Then, the control unit 68a lists the wireless terminals 3 in the descending order of the received power measured by the dynamic reflector 5a, and determines the direction of the wireless terminal 3 having the larger received power as the reflection direction by giving priority to the direction. The control unit 68a updates the list every time the measurement result is received from the dynamic reflector 5a.

(2) [Prioritizing Wireless Terminal 3 Added to the Transmission Signal on the Basis of the Quality Information]

The wireless terminal 3 can add the quality information measured by itself to the transmission signal (notification signal). The dynamic reflector 5a confirms the quality information when receiving the notification signal, prepares a list in which the wireless terminals 3 with poor quality are arranged in order, and determines the direction of the wireless terminals 3 with poor quality as the reflection direction by giving priority to the direction. The control unit 68a updates the list every time the measurement result is received from the dynamic reflector 5a.

(3) [Prioritizing Wireless Terminal 3 on the Basis of the Estimated Position or Direction]

The direction estimation unit 564 estimates a direction to be reflected to each of the wireless terminals 3 on the basis of, for example, the position information of each of the wireless terminals 3.

When the dynamic reflector 5a receives the notification signals from the plurality of wireless terminals 3, the control unit 68a groups the wireless terminals 3 whose directions or positions are the same or almost the same. Further, the control unit 68a takes a difference in the estimation direction with respect to the two wireless terminals 3, and when the difference is equal to or less than a predetermined value, it may be associated as the same group. In this case, the control unit 68a groups all the combinations of the wireless terminals 3.

Also, the control unit 68a calculates the distance between the wireless terminals 3 on the basis of the position information notified from the two wireless terminals 3 even when grouping the wireless terminals 3 on the basis of the position of the wireless terminals 3, and may associate the wireless terminals 3 as the same group when the calculated distance is equal to or less than the predetermined value.

Further, the control unit 68a may determine the direction of a group having a large number of wireless terminals 3 as a reflection direction after the grouping processing. At this time, the control unit 68a may use the direction estimated for the representative wireless terminal 3 selected arbitrarily in the group, may use the average value of the estimated directions of all the wireless terminals 3 in the group, or may use the direction of the wireless terminal 3 located in the direction closest to the average value.

Further, when using the positions of the wireless terminals 3, the control unit 68a applies the position of the representative wireless terminal 3 selected arbitrarily in the group, the centroid point of the positions of all the wireless terminals 3 in the group, and the direction to the position of the wireless terminal 3 closest to the centroid point.

(4) [Prioritizing Wireless Terminal 3 on the Basis of Position of Wireless Terminal 3]

The control unit 68a calculates the distance between the wireless terminal 3 and the dynamic reflector 5a by using the position information of the wireless terminal 3 which can be acquired from the notification signal and the position information of the dynamic reflector 5a itself, lists the wireless terminals 3 in the order of the shorter calculated distance, and preferentially sets the direction of the wireless terminal 3 having the shorter distance as the reflection direction. The control unit 68a updates the list every time the measurement result is received from the dynamic reflector 5a.

(5) [Prioritizing Wireless Terminal 3 on the Basis of Combinations]

The control unit 68a lists priority on the basis of a combination of two or more of the received power, the quality information, the estimated direction or the position on the basis of the above-mentioned method of (1) to (4), and sets a reflection direction.

Further, the reflection direction control device 6a may control the phase so that one dynamic reflector 5a can reflect in a plurality of reflection directions by dividing a plurality of reflection elements 500 included in the dynamic reflector 5a and controlling the reflection direction for each divided reflection element group when receiving notification signals from the plurality of wireless terminals 3.

For example, the reflection direction control device 6a may control so as to reflect the radio waves in the respective directions of the wireless terminals 3 by using N/4 reflection elements 500 for each wireless terminal 3 when the dynamic reflector 5a having N reflection elements 500 receives notification signals from four wireless terminals 3. In this case, although the gain after reflection decreases, the communication quality of the plurality of wireless terminals 3 can be improved at the same time.

Figure 8:
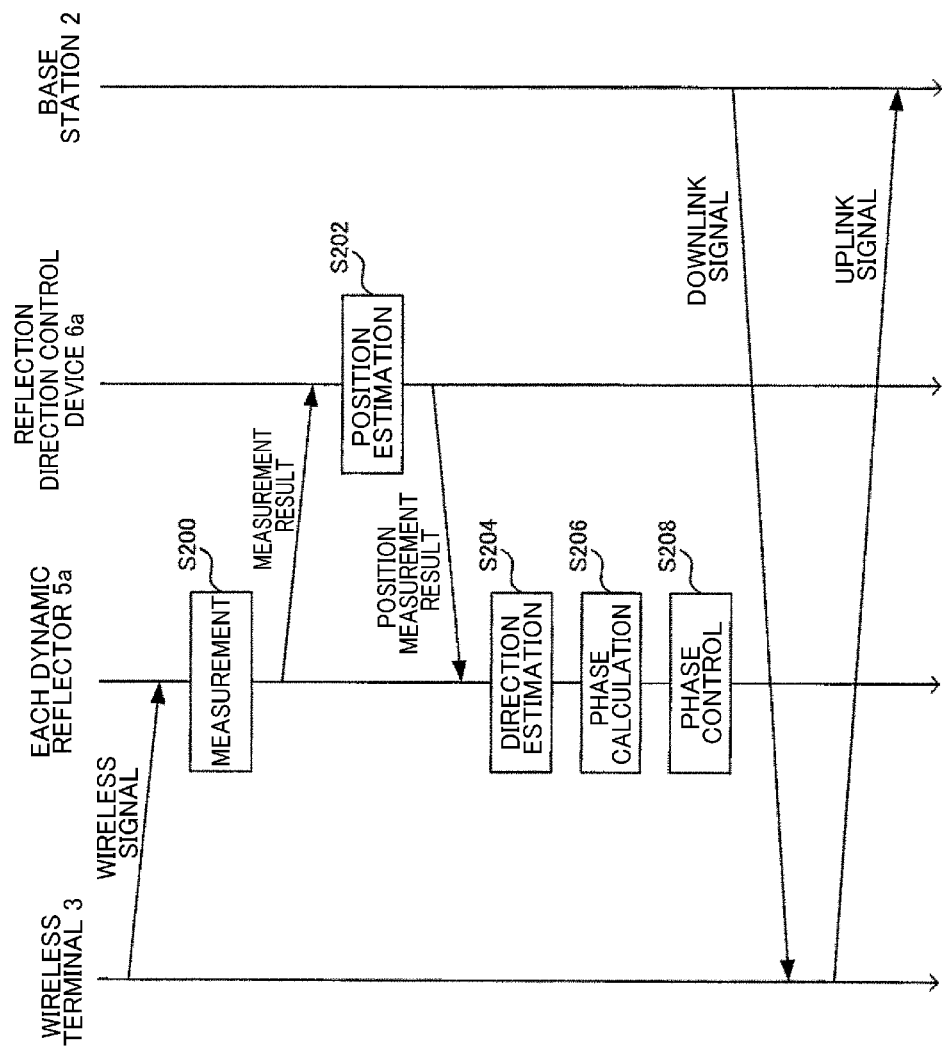
FIG. 8 is a diagram showing an example of a modification of the wireless communication system.

Next, an operation example of a modification example of the wireless communication system 1 including the dynamic reflector 5a and the reflection direction control device 6a will be described. FIG. 8 is a sequence diagram showing an example of operation of a modification of the wireless communication system 1 including the dynamic reflector 5a and the reflection direction control device 6a.

First, when the wireless terminal 3 transmits a radio signal to each dynamic reflector 5a, each dynamic reflector 5a measures received power, for example (S200), and transmits a measurement result to a reflection direction control device 6a.

The reflection direction control device 6a estimates (measures) the position of the wireless terminal 3 on the basis of the radio signal transmitted to the plurality of dynamic reflectors 5a by the wireless terminal 3 (S202), and transmits the positioning result to each dynamic reflector 5a.

Next, each dynamic reflector 5a estimates the incident direction of the radio wave transmitted by the wireless terminal 3 to the reflection unit 50 on the basis of the position of the wireless terminal 3 received from the reflection direction control device 6a (S204).

Next, each dynamic reflector 5a calculates a phase of the radio wave to be reflected by each of the plurality of reflection elements 500 so that the reflection unit 50 reflects the radio wave made incident in the estimated direction toward the base station 2 (S206).

Each dynamic reflector 5 performs phase control (reflection direction control) of the radio wave reflected by each of the plurality of reflection elements 500 (S208). Thereafter, the wireless terminal 3 and the base station 2 mutually perform communication (downlink signals and uplink signals).

Thus, in the wireless communication system 1 and the modification of the radio communication system 1, the wireless terminal 3 estimates the position of each of the wireless terminals 3 on the basis of radio waves transmitted by the wireless terminal 3 to the plurality of reflection units 50, controls the phase of the radio waves reflected by each of the reflection elements 500, therefore can dynamically control the reflection direction of the radio waves with a small calculation amount.

In addition, in the wireless communication system 1 and the modification of the wireless communication system 1, since the dynamic reflector 5 or the dynamic reflector 5a controls the phase of the radio wave reflected by each reflection element 500 when the radio wave arrives, coverage by the base station 2 can be expanded.

The functions of the dynamic reflector 5, the dynamic reflector 5a, the reflection direction control device 6, and the reflection direction control device 6a are not limited to the examples described above, but may be combined optionally. For example, the reflection direction control device 6 may have a function of the phase control unit 582 included in the dynamic reflector 5.

The respective functions of the reflection direction control device 6 and the reflection direction control device 6a may be partially or entirely constituted of hardware such as a PLD (Programmable Logic Device) or an FPGA (Field Programmable Gate Array), or may be constituted as a program executed by a processor such as a CPU.

In other words, the reflection direction control device 6 and the reflection direction control device 6a according to the present invention can be realized using a computer and a program, and the program can be recorded on a recording medium or provided through a network.

Figure 9:
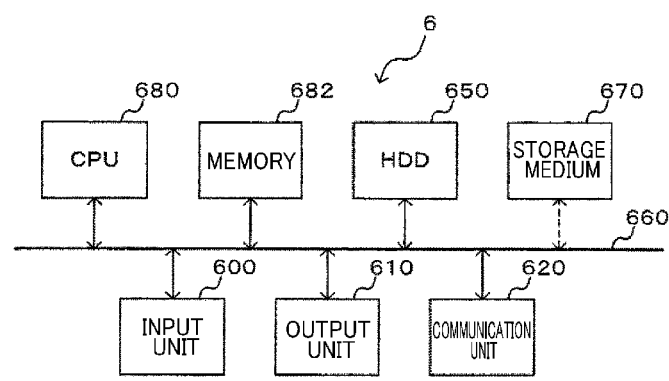
FIG. 9 is a diagram illustrating an exemplary hardware configuration of the reflection direction control device.

FIG. 9 is a diagram showing an example of the hardware configuration of the reflection direction control device 6 according to the embodiment. As shown in FIG. 9, for example, the reflection direction control device 6 includes an input unit 600, an output unit 610, a communication unit 620, a CPU 680, memory 682, and an HDD 650 are connected via a bus 660, and have a function as a computer. The reflection direction control device 6 can input and output data to and from a computer-readable storage medium 670.

The input unit 600 is, for example, a keyboard, a mouse, or the like. The output unit 610 is, for example, a display device such as display. The communication unit 620 is, for example, a wired or wireless network interface.

The CPU 680 controls each unit constituting the reflection direction control device 6 as described above, and performs predetermined processing or the like. The memory 682 and the HDD 650 are storage units for storing data or the like.

The storage medium 670 can store a program or the like for executing functions of the reflection direction control device 6. The architecture constituting the reflection direction control device 6 is not limited to the example shown in FIG. 9. The other configuration constituting the wireless communication system 1 such as the reflection direction control device 6a may be the same hardware configuration as the reflection direction control device 6.

It is assumed that a "computer system" as used herein includes an OS and hardware such as peripheral devices. In addition, a "computer-readable recording medium" refers to a storage device like a portable medium or the like such as a flexible disk, a magneto-optical disk, a ROM, or a CD-ROM.

Furthermore, a "computer-readable recording medium" may also include a part that dynamically holds a program for a short amount of time such as a communication line used in the case of transmitting a program via a network such as the Internet or a communication line such as a telephone line, and a part that holds the program for a certain amount of time such as a volatile memory inside a server or a computer that serves as a client in such a case.

Although embodiments of the present invention were described above with reference to the drawings, it is clear that the above-described embodiments are merely exemplary illustrations of the present invention and the present invention is not limited to the above-described embodiments. Accordingly, additions, omissions, substitutions, and other modifications of the components may be made within a scope that does not depart from the technical spirit and scope of the present invention.

REFERENCE SIGNS LIST

1 Wireless communication system
2 Base station
3 Wireless terminal
4 Reflection direction control system
5, 5a, 5-1, 5-2 Dynamic reflector
6, 6a Reflection direction control device
50 Reflection unit
52 Antenna unit
54 Terminal signal processing unit
56, 56a Control signal processing unit
58 Reflection control unit
60, 60a Signal processing unit
62 Position estimation unit
64 Direction estimation unit
66 Phase calculation unit
68, 68a Control unit
500 Reflection element
540 RF unit
542 Signal processing unit
544 Measurement unit
560 Signal processing unit 562 Signal processing unit
564 Direction estimation unit
566 Phase calculation unit
580 Phase conversion unit
582 Phase control unit
600 Input unit
610 Output unit
620 Communication unit
650 HDD
660 Bus
670 Storage medium
680, 680a CPU
682, 682a Memory

The invention claimed is:

1. A reflection direction control system comprising:
a plurality of reflection units configured to include a plurality of reflection elements, respectively;
a position estimation unit configured to estimate a position of each of the wireless terminals on the basis of radio waves transmitted from one or more wireless terminals to the plurality of reflection units;
a direction estimation unit configured to estimate an incident direction of the radio wave transmitted by each of the wireless terminals to the reflection unit on the basis of the respective positions of the wireless terminals estimated by the position estimation unit;
a phase calculation unit configured to calculate a phase of the radio waves to be reflected by each of the plurality of reflection elements so that the reflection unit reflects the radio waves made incident in the direction estimated by the direction estimation unit in a predetermined direction, wherein the phase calculation unit calculates the phase of the radio waves to be reflected by each of the plurality of reflection elements for each reflection unit on the basis of predetermined priority; and
a phase control unit configured to control the phase of the radio waves reflected by each of the plurality of reflection elements on the basis of the phase calculated by the phase calculation unit.

2. The reflection direction control system according to claim 1, wherein
the phase calculation unit calculates the phase of the radio waves to be reflected by each of the plurality of reflection elements so that the reflection unit reflects the radio wave made incident from the predetermined direction toward a cluster composed of a plurality of wireless terminals satisfying a predetermined condition.

3. The reflection direction control system according to claim 1, wherein
the phase calculation unit, when one reflection unit reflects radio waves transmitted by the plurality of wireless terminals, divides the plurality of reflection elements into a plurality of reflection element groups, and calculates the phases of the radio waves to be reflected by each reflection element so as to reflect the radio waves toward different wireless terminals for each reflection element group.

4. The reflection direction control system according to claim 2, wherein the predetermined condition results in the cluster having most number of wireless terminals associated therewith.

5. The reflection direction control system according to claim 2 wherein the predetermined condition requires mutual distance between the plurality of wireless terminals in the cluster be less than a predetermined distance.

6. A reflection direction control device comprising;
a position estimation unit configured to estimate a position of each wireless terminal on the basis of radio waves transmitted by one or more wireless terminals to a plurality of reflection units each including a plurality of reflection elements;
a direction estimation unit configured to estimate an incident direction of the radio waves transmitted by each of the wireless terminals to the reflection unit on the basis of the respective positions of the wireless terminals estimated by the position estimation unit;
a phase calculation unit configured to calculate the phase of the radio waves to be reflected by each of the plurality of reflection elements so that the reflection unit reflects the radio waves made incident in the direction estimated by the direction estimation unit in a predetermined direction, wherein the phase calculation unit, when one reflection unit reflects radio waves transmitted by the plurality of wireless terminals, divides the plurality of reflection elements into a plurality of reflection element groups, and calculates the phases of the radio waves to be reflected by each reflection element so as to reflect the radio waves toward different wireless terminals for each reflection element group; and
a phase control unit configured to control the phase of the radio waves reflected by each of the plurality of reflection elements on the basis of the phase calculated by the phase calculation unit.

7. A non-transitory computer-readable storage medium storing a reflection direction control program for enabling a computer to function as each unit of the reflection direction control device according to claim 6.

8. A reflection direction control method comprising:
estimating a position of each of the wireless terminals on the basis of radio waves transmitted by one or more wireless terminals to a plurality of reflection units each including a plurality of reflection elements;
estimating an incident direction of the radio waves transmitted by each of the wireless terminals to the reflection unit on the basis of the estimated position of each of the wireless terminals;
calculating a phase of the radio waves to be reflected by each of the plurality of reflection elements so that the reflection unit reflects the radio waves made incident in the estimated direction in a predetermined direction, wherein the phase of the radio waves to be reflected by each of the plurality of reflection elements is calculated on the basis of predetermined priority; and
controlling the phase of the radio waves reflected by each of the plurality of reflection elements on the basis of the calculated phase.

* * * * *